Oct. 12, 1937.  J. M. HENDRICKSON  2,095,251
AIRCRAFT FLIGHT CONTROL
Filed Nov. 11, 1933  5 Sheets-Sheet 1

Fig.1

INVENTOR
James M. Hendrickson
by Edward A. Lawrence,
his attorney.

Oct. 12, 1937.   J. M. HENDRICKSON   2,095,251
AIRCRAFT FLIGHT CONTROL
Filed Nov. 11, 1933   5 Sheets-Sheet 3

INVENTOR
James M. Hendrickson
by Edward A. Lawrence
his Attorney

Oct. 12, 1937.  J. M. HENDRICKSON  2,095,251
AIRCRAFT FLIGHT CONTROL
Filed Nov. 11, 1933   5 Sheets-Sheet 4

INVENTOR
James M. Hendrickson
by Edward A. Lawrence
his Attorney

Patented Oct. 12, 1937

2,095,251

UNITED STATES PATENT OFFICE 2,095,251

AIRCRAFT FLIGHT CONTROL

James M. Hendrickson, McKeesport, Pa.

Application November 11, 1933, Serial No. 697,600

14 Claims. (Cl. 244—77)

My invention comprises generally a system for controlling aircraft in flight.

The following are among the important objects which I have in view.

The provision of new and improved means to control the flight of the aircraft.

The provision of automatic means for preventing stalling when the aircraft is in ascending flight.

The provision of an electrical operating means including an altimeter whereby the aircraft in flight may be maintained at a predetermined altitude and course through remote control.

The provision of means whereby the electrical energy supplied for controlling the aircraft is regulated in proper proportion to the air speed at which the aircraft is traveling.

The provision of a new and improved fluid control switch which may also be used for other purposes.

The provision of electrically operated means for actuating the throttle of the aircraft engine throughout a given range in proper proportion to the speed of travel of the aeroplane.

Other objects will appear from the following description.

In the accompanying drawings wherein I have illustrated a practical embodiment of the principles of my invention.

The following is a description of my invention as illustrated in the drawings.

Referring first to Figs. 1 to 8, inclusive, of the drawings, 1 represents a tube of nonconductive material, such as bakelite or glass, having its ends closed as by caps 2 which are of conductive material.

The caps are provided with base portions whereby the tube is mounted on the top platform 3. The platform 3 is hinged at one end, as at 4, to an intermediate platform 5 adjacent to one end of the latter. Platform 5 is in turn hinged at its other end, as at 6, to the base platform 7 adjacent one end of the latter. Platform 7 is mounted on the structure of the aeroplane and disposed in parallelism to the longitudinal axis of the aeroplane. The hinges 4 and 6 are spring hinges which tend to hold the platform collapsed in flat relation with each other.

Figure 1:
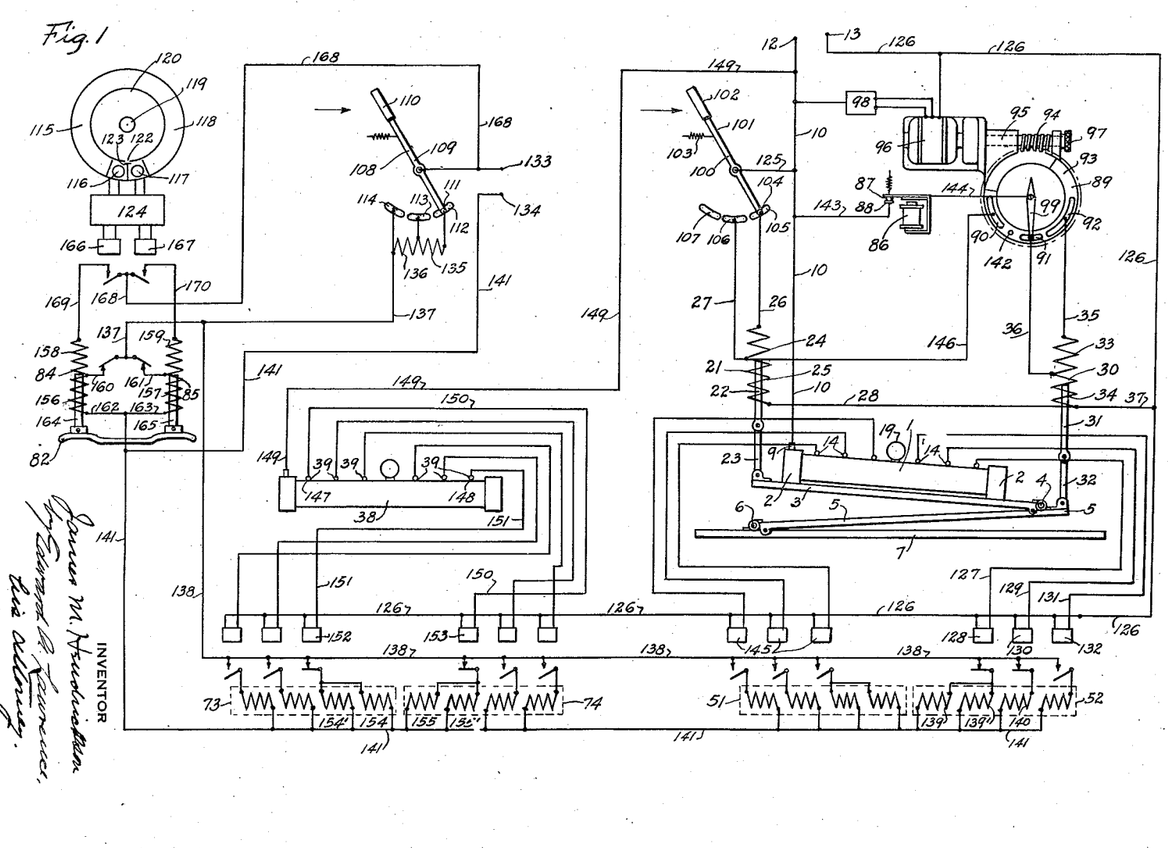
Fig. 1 is a diagrammatic view showing the electric system and the arrangement of mechanism relative thereto for maintaining the stability of and controlling the aeroplane in flight.
Figure 5:
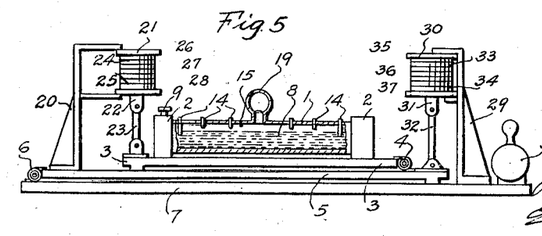
Fig. 5 is a side elevation of the flight control switch and associated parts, the platform being in flat superimposed relation as when the solenoids are deenergized.

The tube 1 is partially filled by a body of liquid indicated at 8 in Fig. 5, such for instance as mercury, and which is a good conductor of electricity. One of the end caps 2 of the tube, the left cap in the drawings, is provided with means, such as the binding post 9, for the attachment of the electric conductor 10 which is connected to a source of potential 12, as shown in Fig. 1. The return circuit of the source of potential is indicated at 13.

Along its top center line and on either side of its mid-section the wall of the tube is provided with a plurality of spaced apart ports through which extend the contact members 14, the top level of the mercury being at such elevation that when the tube is substantially horizontal the lower ends of the members 14, except the two end members, are out of contact with the mercury, as shown in Fig. 5. The two end members are extended sufficiently into the tube to be always in electrical contact with the mercury when the tube is horizontal. To retard sparking between the members 14 and the adjacent surface of the mercury to prevent oxidation of the mercury I prefer to fill the tube above the mercury level with a suitable non-electrolytic fluid, indicated at 15 in Fig. 5, such for instance as brombenzene.

Figures 13, 14, 15, 16, 17:
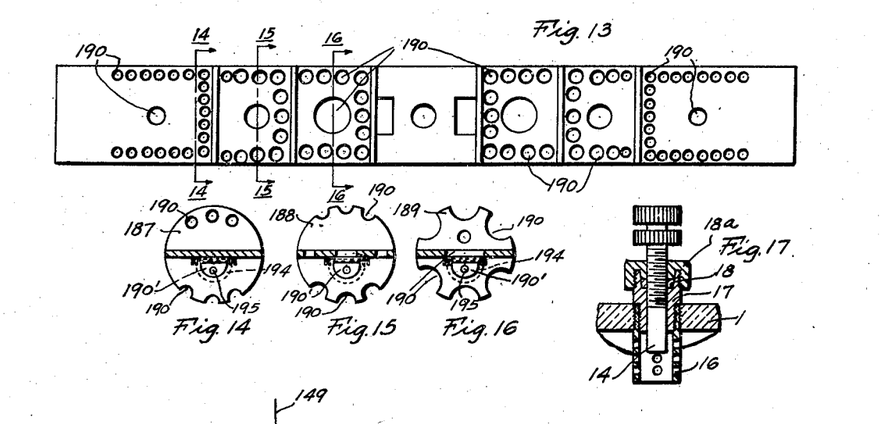
Fig. 13 is a plan view of the baffle member used therein.
Figs. 14, 15, and 16 are cross sectional views taken along the lines 14—14, 15—15, and 16—16 in Fig. 13.
Fig. 17 is an enlarged sectional view showing the mounting of one of the contact members in the tube switch.

As shown in Fig. 17, in each of the openings in the top wall of the tube 1 is screwed the upper threaded end of a tubular shield 16 of non-conductive material which depends within the tube 1 and has perforations in its walls to admit the fluid 8 while preventing splashing of the same against the members 14. Screwed into the threaded upper ends of the shields 16 are metal bushings 17 and the bores of the bushings are threaded so that the members 14 may be screwed down therein to project the desired extent into the tube 1. 18 represents compressible packing seated in the enlarged upper bore of the bushing and compressed by a screw gland 18a.

19 represents a chamber above and interiorly connected with the interior of the tube 1, which chamber is normally at least partially filled with air, and as the liquid or liquids in the tube expand with changes of temperature, such expansion is taken care of by the compression of the air in the chamber. It also prevents slapping of the liquids as the tube is tipped, the tube being in itself totally filled with the liquids 8 and 15. The preferred form of the tube 1 is illustrated fully in Figs. 12 to 17, inclusive and is hereinafter more fully described.

A bracket 20 mounted on the platform 5 adjacent to its hinged end supports a solenoid 21 whose movable core 22 is connected by a link 23 with the free end of the platform 3. The coil of the solenoid 21 is formed of two sections, an upper section 24 and a lower section 25. The coil 24 is wound with wire of proper size to withstand the maximum potential of the system when it is energized in a circuit in series with the coil 25. When the coils 24 and 25 are energized in unison they furnish the required number of ampere turns to magnetically draw the movable core 22 to its upper limit in the solenoid.

The coil 24 forms the winding of the solenoid 21 between the leads 26 and 27, the lead 27 being a common connection to the lower end of the coil 24 and the upper end of the coil 25 as shown in Fig. 5. The lower coil 25 is wound with wire of the proper size to withstand the maximum potential of the system and is designed to furnish the proper number of ampere turns required to elevate the armature to an intermediate position. 28 indicates the lead connecting the lower end of the coil 25 to the system. Since the coil 24 may only be energized in series with the coil 25, the lead 28 serves as a return circuit.

On the opposite end of the base platform 7 is erected a bracket 29 which carries a solenoid 30 whose movable core 31 is connected by a link 32 with the free end of the intermediate platform 5.

As in the case of solenoid 21 the coil of the solenoid 30 is formed of two sections 33 and 34 connected up in a similar manner as in the case of the coil 21 by means of the leads 35, 36, and 37.

It is evident that if the solenoid 21 is energized while the solenoid 30 remains deenergized the platform 3 will be swung upwardly with the hinge 4 as an axis, thus tipping the tube 1 clockwise and bringing one or more of the right hand members 14 into contact with the mercury according to the angle of tip. Again, if the solenoid 30 be energized while the solenoid 21 remains deenergized the intermediate platform 5 will be swung upwardly with the hinge 6 as an axis, thus tipping the tube 1 in the opposite direction or counterclockwise, and bringing one or more of the left hand series of members 14 into electrical connection with the mercury in the tube 1. Again if the two solenoids 21 and 30 be simultaneously energized the movements of the two platforms 3 and 5, swinging on opposite axes, may be compensatory, causing the platform 3 and the tube 1 to maintain a substantially horizontal position, with the result that all of the contact members 14, except the two end members, are out of electrical connection with the mercury in the tube 1.

The tube 1 is employed as a switch which controls the operation of the intermediary control relays which in turn control the circuits for energizing the solenoids for operating the elevators of the aircraft.

Figures 6, 7:
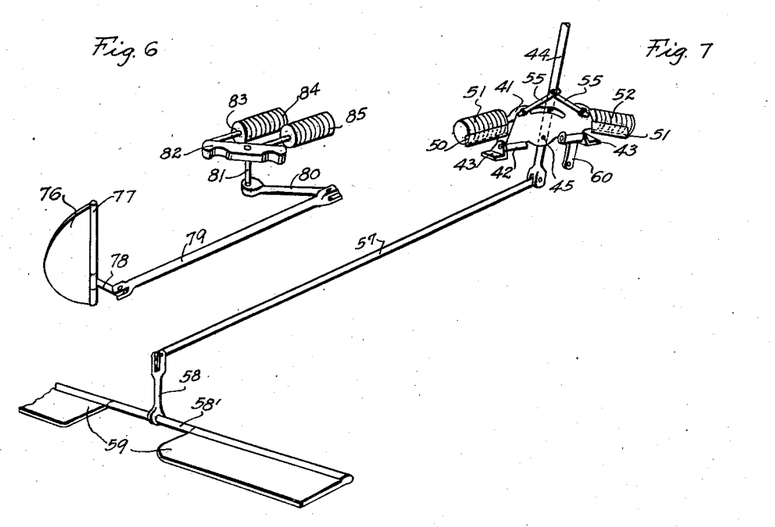
Fig. 6 is a diagrammatic view showing the rudder control and the connection of the operating solenoids thereto.
Fig. 7 is a like view showing the elevator control and the operating solenoids thereof.

38 represents a second tube of similar construction to tube 1 and mounted on the base platform 7 and disposed at right angles to the tube 1 along the transverse axis of the aircraft, as shown in Fig. 5. The tube 38 is also shown in Fig. 7 and at either end it is provided with a series of contact members 39 arranged similarly to the arrangement of the contact member 14 of the tube 1. The tube 38 acts as the electric switch of the solenoids which control the movement of the ailerons through a system of relays which operate the aileron solenoids.

Referring now to Figs. 2, 3, 4, 6, 7, and 8, 40 represents the cradle of the control stick assembly, being provided with upwardly extending parallel side plates 41 which rise from the alined but spaced apart sleeve bearings 42 which are rotatably mounted on the trunnions 43 which in turn are mounted on the aeroplane. Thus the cradle 40 swings on the trunnions in a plane at right angles to that of Fig. 2 and to the longitudinal axis of the aeroplane, providing for lateral motion of the control stick 44.

44 represents the control stick which extends between the side plates 41 and is pivoted intermediate of its length on a bolt 45 which is carried by the parallel ears 46 depending from the side plates 41 between the bearings 42. The bolt 45 is centered with the axes of the trunnions 43. The spacing between the sleeve bearings 42 gives clearance for the forward and rearward movement of the control stick, which movement is in a plane at right angles to the movement of the cradle 40. Thus a universal movement is provided for the control stick.

The path of forward and rearward movement of the control stick is limited by means of a pin 47 which extends through the control stick and through arcuate slots 48 in the side plates 41. Washers 49 secured to the outer ends of the pin 47 keep it from displacement.

Figure 2:
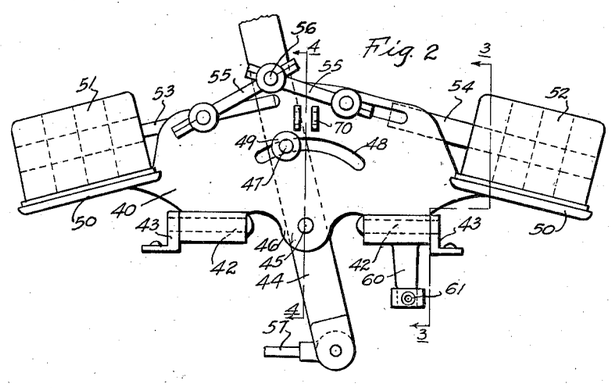
Fig. 2 is a side elevation of the control stick assembly, the solenoids which operate the elevators being also shown, and parts being omitted.
Figure 3:
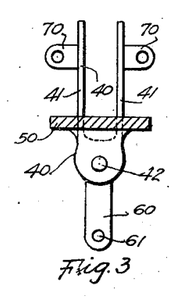
Fig. 3 is an end elevation of the cradle of the control stick assembly.

At its opposite ends the cradle 40 is provided with solenoid platforms 50 upon which are mounted the solenoids 51 and 52 respectively. The movable cores of said solenoids are represented at 53 and 54 respectively, and they are connected by links 55 with a cross pin 56 extending through the control stick 44 above its axis of movement. Thus when the solenoid 51 is energized, retracting its core 53, the control stick is swung to the left as shown in Fig. 2, which is assumed for the present purposes to be toward the pilot. On the contrary if solenoid 52 is energized the control stick is swung away from the pilot to the right in Fig. 2.

The lower end of the control stick 44 extends below the cradle 40 and is connected by a link 57 to a crank 58 on a properly journaled shaft 58' which carries the elevators 59. It is evident that if the solenoid 51 be energized, the elevators 59 will be swung upwardly from their position shown in Fig. 7, thus causing the aeroplane to climb. On the contrary, if the solenoid 52 be energized the elevators will be swung downwardly, causing the plane to descend.

The coils of the solenoids 51 and 52 are formed in sections as in the case of the solenoids 21 and 30.

Depending from the cradle 40 is an arm 60 connected by the link 61, the bell crank 62, the link 63 and a second bell crank 64 which is pivotally connected to a reach rod 65. The bell cranks 62 and 64 swing on fixed horizontal axes. Connected to either end of the rod 65 are the opposed bell cranks 66 pivoted on fixed vertical axes. The bell cranks 66 are respectively connected by links 67 to cranks 68 arranged to operate the left and right ailerons 69L and 69R which are carried by the wings in the usual manner, being opposed to each other in their disposal.

Figure 4:
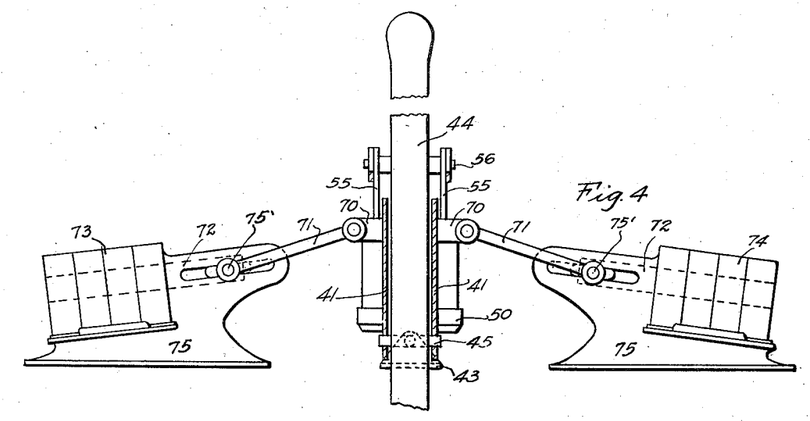
Fig. 4 is a sectional view taken along the line 4—4 in Fig. 2, the control stick being shown in full lines and in a vertical position.

At either side the cradle 40 is provided with twin pierced ears 70 between which are pivotally attached the inner ends of links 71 which have their outer ends connected to the movable cores 72 of a pair of opposed solenoids 73 and 74, as shown in Fig. 4. The solenoids 73 and 74 are mounted on the stands 75 fixed to the aeroplane. The stands 75 have slotted guides in which they carry the wrist pins 75' connecting the links 71 with the cores 72.

Figure 8:
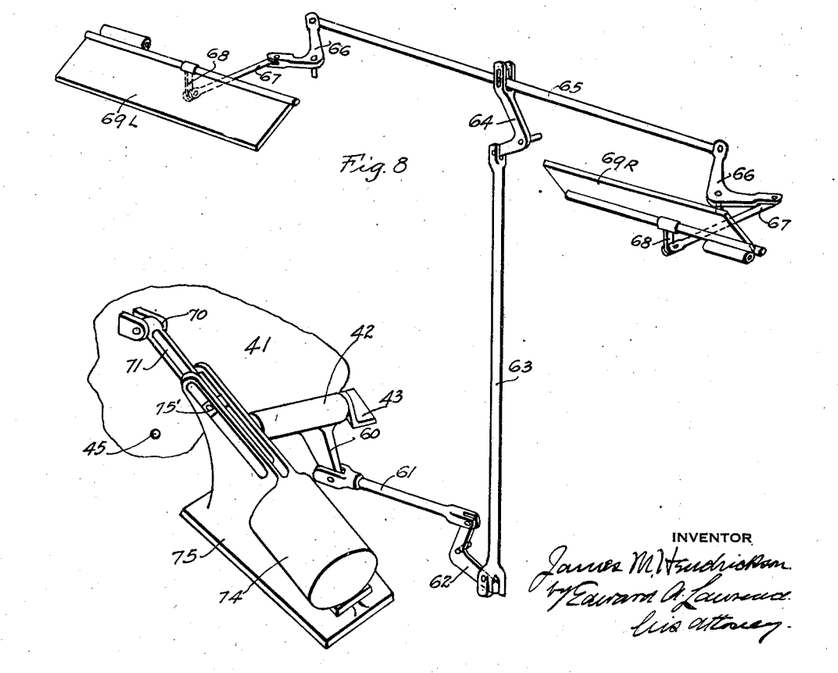
Fig. 8 is a like view showing the aileron control and associated parts.

It is obvious that when the solenoid 73 is energized the cradle 40 will be swung to the left in Fig. 4 into the position shown in Fig. 8, thus raising the aileron 69R and lowering the aileron 69L, which would result in a roll of the aeroplane clockwise or to the left. Again by energizing the solenoid 74 an opposite swing of the casing is effected, thus reversing the positions of the ailerons and causing a reverse roll of the aeroplane to the right.

The coils of solenoids 73 and 74 are likewise divided into sections, some or all of which may be energized to operate the aeroplane controls accordingly.

The control stick cradle mechanism described provides a low friction device that does not require any disengaging clutch in order to permit the airplane to be manually controlled. The pilot may even control the ship when it is being automatically operated by overcoming the forces set up by the solenoids, or he may pull a master switch which disconnects the electrical energy from the control system. The plane may then be operated as any ordinary plane.

In all the known so-called robot control mechanism a clutch disengaging mechanism is required which increases the load of the craft and multiplies the chances for apparatus failure. With my device I have eliminated such undesirable mechanisms.

It is obvious that my simplified rudder control mechanism is provided with the same characteristic features. Upon disconnecting the electrical system from my rudder control it may be operated manually without additional mechanism/to disengage it.

As a further object of my invention I provide a system for automatically controlling the flight of aircraft simultaneously with the manual operation of a pilot.

Referring now to Fig. 6, 76 represents the rudder pivotally mounted on the vertical axis 77 and provided with a crank 78 which is connected by a link 79 to another crank 80 fixed on a vertically disposed shaft 81 which is suitably journaled in the aeroplane and carries on its upper end the rudder bar 82 which is arranged in the ordinary way to permit the pilot to operate it with his feet. The opposite ends of the rudder bar 82 are connected to the cores 83 of a pair of solenoids 84 and 85. When the solenoid 84 is energized the rudder 76 is swung clockwise in Fig. 6, causing the plane to turn to the left, but when the solenoid 85 is energized the rudder is swung counterclockwise, causing the plane to turn right.

The electrical energy is preferably supplied to the sources of potential 12 and 13 by means of a generator propelled by the aeroplane motor and arranged to maintain a constant charge to a storage battery. The generating and storage unit are understood to be similar to those used by the automotive industry in automobiles and therefore are not shown on the attached drawings.

86 represents an automatic cut-out switch generally employed in such systems in a circuit between the generator and the battery for disconnecting the same when the aeroplane engine has stalled and the generated voltage falls below a predetermined amount.

I provide the switch 86 with the additional contacts 87 and 88 for opening the circuit through the altimeter 89, preventing the aeroplane controls from assuming an ascending angle when the generated voltage has dropped below the predetermined amount.

It is obviously necessary to cause the plane to glide if the motor has stalled and to do so the controls must be prevented from assuming an ascending angle or the plane may go into a tailspin which is ordinarily disastrous.

The altimeter 89 is provided with the arcuate contacts 90, 91, 92 which are mounted on the perimeter of the gear 93 supported on the base of the altimeter. The gear 93 meshes with the worm 94 which is keyed to the shaft 95 of the motor 96. The end of the shaft opposite the motor is provided with a thumb piece 97 to permit the pilot to adjust the position of the contacts of the gear 93 by manual rotation of the shaft 95.

The box 98 is provided with a reversing switch for the motor 96, which switch is controlled by proper radio control means for remotely adjusting the position of the contacts on the gear 93 from a radio base station. This device furnishes the operator at the radio station with complete control of the altitude at which the plane is to fly when a pilot is not flying the plane.

The needle contactor 99 of the altimeter is arranged to electrically engage the arcuate contacts for closing circuits to initiate the movement of the elevators to bring the plane to the predetermined altitude at which it is to fly.

100 represents an air speed indicator of simplified form comprising an arm 101 pivotally supported, and carrying a blade portion 102 on one end. The blade portion 102 is arranged to extend beyond the fuselage of the plane so as to be exposed to the pressure of the air in the direction as shown by the arrow, as the plane is flying. The spring 103 tends to hold the arm to the left as shown in Fig. 1 and is calibrated so as to permit the arm to move in a clockwise direction, such movement being in proportion to the air pressure effective against the blade 102. This device indicates the speed of the aircraft relative to the air. If the arm is forced to the extreme right the maximum air speed is attained and if to the left as shown, the plane is nearly at a stall.

To those familiar with aircraft and their design it is a well known fact that each ship, because of its individual characteristics must attain a specific air speed before it can develop the required lifting power to ascend at a given angle of inclination.

If the aeroplane is provided with sufficient propelling power it then may be permitted to ascend at a steep angle until the air speed in combination with the lifting power of the craft results in a condition tending to stall the motor, at which time it must necessarily descend to regain sufficient air speed to keep the plane from falling. These conditions are subject to variations due to the wind and other influences known to those skilled in the art. The relative motion of the wind to the plane also governs the angle of attack. For this reason I provide the other end of the air speed indicator arm 101 with a contact 104 arranged to engage the arcuate contacts 105, 106, and 107 which control the intermediary circuits of the elevators and accurately determine the exact angle of inclination the plane should assume for a given air speed.

It is also well known to those familiar with the art that the actual pressure required to move the controls varies according to the speed of the aircraft. I therefore provide a second air speed indicator 108 similar to the indicator 100 and arranged to automatically cut resistance out of the control power circuit as the air speed of the ship is increased. The arm 109 is provided with the blade 110 on one end and the contacting member 111 on the other and arranged to electrically engage the arcuate contacts 112, 113, and 114. Since these indicators are alike they will assume the like positions for a given set of conditions or they may be combined into one instrument.

Figures 9, 10:
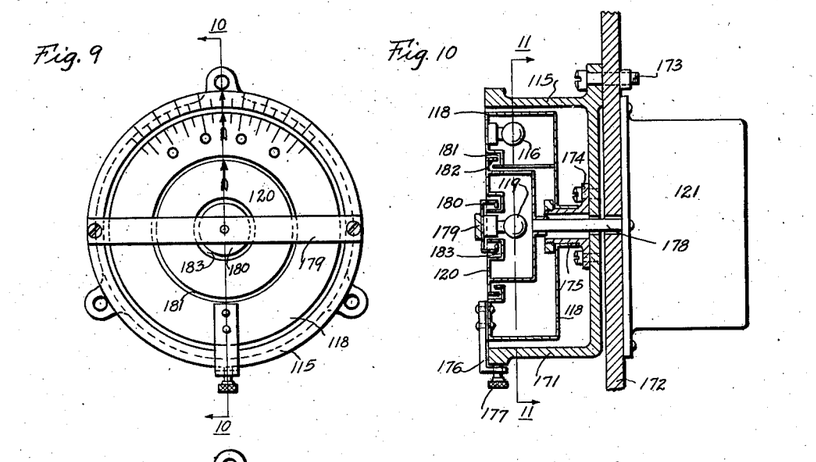
Fig. 9 is an elevation of my direction finder.
Fig. 10 is a sectional view of the same taken along the line 10—10 in Fig. 9.

The direction indicator 115 as shown in Fig. 1 is provided with two light sensitive cells, such as photo-electric cells 116 and 117 in their individual compartments of the movable member 118 of the indicator. 119 represents a lamp which is suspended in the rotary drum portion 120 of the indicator that is operated by the gyroscopic instrument in the box 121 of Fig. 10. A detailed explanation of the instrument will appear later in the specification.

The rotary drum portion 120 of the direction indicator is provided with the small window 122 which is backed and obscured by the target 123 when the plane is traveling on its proper and predetermined course. If the plane were to deviate from the course the drum 120 would rotate with respect to the ship and the number of degrees of rotation would be indicated on the face of the instrument. At the same time the lamp 119 will throw light upon one of the photo-electric cells and by means of the amplifying unit in the box 124 a current of sufficient intensity is caused to operate intermediary rudder controls for correcting the flight of the ship.

I also provide a radio control unit within the box 124, which is designed to receive signals from a remote control base or ground station. After the signals have been received they will selectively operate one of the rudder control relays which in turn control the movement of the rudder to maintain the aircraft upon the desired course. The application of remote radio control on the direction indicator is omitted as its detail design and operation is not to be included within the scope of this invention.

It should also be noted that this new and novel direction indicator is in itself an improvement in the art and is applicable in guiding craft of any nature such as ships or torpedoes, air and marine.

Having discussed broadly the functions of the apparatus, a description of their functions in the aircraft control system will be given.

Referring to Fig. 1, the current will flow from the source of supply 12 through conductors 10, 125, speed indicator arm 101, contacts 104, 105, conductor 26, and coils 24 and 25 (in series) of the solenoid 21 and return through the conductors 28, 37 and 126 to the return circuit 13. Having thus fully energized solenoid 21, the core 22 is magnetically drawn therein tilting the tube 1 downwardly to the right.

Tilting of the tube 1 in this manner causes the mercury to come in contact with contact members 14 on the righthand end of the tube, setting up another circuit from the source of supply 12 through the conductor 10, the post 9, the mercury 8, the righthand contacts 14, the conductor 127, and the relay 128, and return through the conductor 126 to the return circuit 13, thus energizing the relay 128. As shown in Fig. 1, the relay 130 is also energized, through the conductor 129, in multiple with the relay 128. If the tube 1 were tilted to a steeper angle it is obvious that the relay 132 would likewise be energized.

As in Fig. 1 the contacts of the energized relays 128 and 130 are shown in their closed position, causing three sections of the elevator solenoid 52 to become energized from the source of the control power circuit indicated at 133 and 134 which may be of a higher voltage than the intermediary control system to simplify the design of the control operating solenoids and furnish them with sufficient energy to permit them to properly function under a wide range of constantly changing conditions.

Current will then flow from the source 133 through the indicator arm 109, contacts 111, 112, resistors 135, 136, conductors 137, 138, the closed contacts of relays 128 and 130 to the coils 139, 139', and 140 of solenoid 52 and return through the conductor 141 to the return side of the supply 134. As previously described, upon energizing the solenoid 52 the elevators 59 will be lowered, the trailing edge of the elevator being below its neutral position giving a positive elevator angle which causes the plane to descend.

It will be noted that the air speed indicator indicates that the air speed of the plane is low and the plane is approximating a stalling condition and it is therefore necessary to give the elevator a negative angle in order to permit the plane to go into a glide and regain its air speed.

At the same time the altimeter is indicating that the plane is flying below the altitude at which it is supposed to fly, which desired altitude would be indicated by the needle 99 registering with the space 142 intermediate of the contacts 90 and 91, the indicator 99 being shown to the right thereof. The altimeter will then endeavor to readjust the altitude of the plane so that it will fly at its prescribed setting and will close a circuit for energizing the intermediary control relays to cause the plane to ascend.

Current will then flow from the source 12 through the conductors 10, 143, contacts 88, 87 of the cutout relay 86, conductor 144, indicator 99, contact 91, conductor 36 to coil 34 of solenoid 30 and return through conductors 37 and 126 to the return side of the source of supply 13. Thus a part 34 of the solenoid 30 is energized, magnetically drawing the core 31 therein, lifting the intermediate platform 5, tending to lift the tube 1 to the left which would ultimately cause the mercury in the tube to make contact with the terminals 14 on the left end of the tube, energizing the intermediary control relays 145 which in turn would energize the solenoid 51 to pull the elevators up into a negative angle to make the plane ascend.

The altimeter 89 is provided with a contact 90 which lies above the normal flying position 142 and which is connected to the coil 25 of the solenoid 21 by the conductor 146. If the plane is flying above the predetermined altitude the needle 89 will engage the contact 90 and close the circuit for tilting the tube switch 1 down to the right, causing the plane to descend.

As shown in Fig. 1, the whole of the solenoid 21 is energized, whereas only a part of the solenoid 30 is energized, the result of which permits the first two contacts 14 on the right end of the tube 1 to be in electrical engagement with the mercury.

If the whole or an equal part of the solenoids 21 and 30 were energized, it is obvious that the tube 1 would be maintained in a horizontal position and the variations being thus compensated, the plane would fly horizontally.

The flight conditions, under which the controls of the plane have just been described, are as follows:—The plane was approximating a stall and the air speed was very slow, causing the tube switch 1 to operate the elevators to a positive angle, making the plane glide or giving it a negative pitch. On the other hand the plane was flying below its prescribed altitude and the altimeter actuated the control circuits to correct this condition, the net result being that the plane was prevented from stalling and it is being made to assume a small negative pitch causing it to glide with the least loss of altitude until the air speed is increased sufficiently to allow it to ascend to the proper altitude.

It is obvious that I can employ a greater number of contacts 14 in the tube switch 1 and provide an equal number of intermediary control relays for operating an additional number of coils in the solenoids 51 and 52, thereby providing a more sensitive mechanism for controlling the aeroplane.

It is further evident that speed indicators 100 and 108 may be provided with a greater number of contacts for operating an increased number of coil sections of the solenoid 21, and for introducing smaller graduations of resistance, thus rendering the control more sensitive.

The electrical system just described involves the control of the longitudinal axis of the aeroplane which is ordinarily referred to as the "X axis", the angular movement of which is termed the pitch.

I will now describe the system for controlling lateral or "Y axis" of the plane which is at right angles to the "X axis" and whose motion is described as a roll. If the right wing tilts downwardly it is termed a positive roll and the converse being a negative roll. As one object of my invention, I provide a system for constantly maintaining the plane on even keel, maintaining the wings in a horizontal plane. The axis of the plane is governed by the control surfaces on the wings called ailerons.

As shown in Fig. 1, the tube switch 38 is horizontal, at which time only the contacts 147 and 148 at the ends of the tube will be in electrical engagement with the mercury. This results in equal energization of the opposed aileron solenoids which keep the ailerons in their neutral position.

The current coming from the source of supply 12 flows through the conductor 149, the mercury in the tube 38, and in multiple through the contacts 147, 148, the conductors 150, 151, to the relays 152, 153, and return through conductor 126 to the return supply 13.

Relays 152, 153 having been energized, their respective contacts will be closed as shown and current will flow from the source 133 of the control power circuit through the speed indicator arm 109, the contacts 111, 112, the resistors 135, 136, the conductors 137, 138, the closed contacts of relays 152, 153, to the solenoid coil sections 154, 154', 155, 155', all of which are in multiple, of the solenoids 73 and 74, and return through the conductor 141 to the return side of the supply 134.

It is obvious that if the plane be flying in a positive or negative roll the respective contacts 147 or 148 will be brought into play, tending to correct the roll and cause the plane to fly normally—the amount of the roll determining the number of coils of the solenoids 73 or 74 that may be required to be energized to correct the position of the plane.

Since the air speed of the plane is very slow, the speed indicator 108 is at the extreme left in which position the total amount of resistance is included in the circuit, thus reducing the voltage on the apparatus and the effective power of the control solenoids 51, 52, 73, and 74. As the air speed increases, the resistance is removed from the circuit and increased power is applied to the control surfaces of the plane which is required for the faster speeds.

The vertical axis of an aeroplane is represented as the "Z axis", which is normal to the X and Y axes. If the aeroplane turns about this axis in a clockwise direction, it is termed a positive yaw, the converse being a negative yaw.

All planes are provided with rudders for guiding them. If the plane is turned to the right or given a positive yaw or to the left and given a negative yaw, this is accomplished by the proper movement of the rudder 76.

I provide as a part of my invention the solenoids 84 and 85 for operating the rudder 76 as previously described. These solenoids are provided with two windings each 156, 157, 158, and 159. The complementary windings 156 and 157 of the solenoids 84 and 85 respectively are at all times energized from the source 133 of the control power circuit through speed indicator arm 109, the contacts 111, 112, the resistors 135, 136, the conductor 137, the contacts of relays 166 and 167 which are closed when the relays are deenergized, the conductors 160 and 161 to the coils 156 and 157 of the solenoids 84 and 85, which are in multiple and return through the conductors 162, 163, 141 to the return side of the supply 134. The coils 156 and 157 being the same in design and energized in multiple will equal magnetic force upon their respective cores 164 and 165 to maintain the rudder bar 82 and the rudder 76 in their neutral positions, thus directing the plane along its prescribed straight line course.

The direction indicator 115 previously described is brought into play when the plane deviates from its course. If the plane deviates from the course to the right creating a positive yaw, the drum 120 will rotate in a clockwise direction and the photo-electric cell 116 will become energized by the light coming from the light source 119 through the window 122. The photo-electric cell will in turn energize the relay 166 through the amplifier in the box 124.

Upon energizing the relay 166, a circuit is closed, causing current to flow from the source of supply 133 of the control power circuit through the conductor 168, the contact of the relay 166 which is closed when the relay is energized, the conductor 169 to the coils 158 and 156 in series of solenoid 84 and return through conductors 162, 141 to the return side 134 of the source of electrical supply.

The energized solenoid 84 will then draw the rudder bar 82 in the clockwise direction, causing the rudder to turn the plane back onto the proper course.

Figure 11:
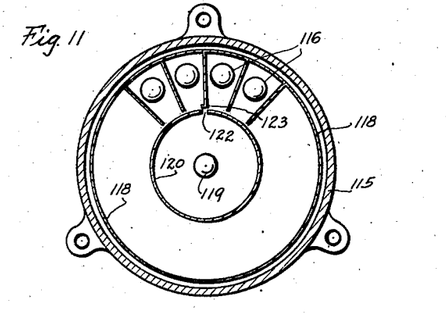
Fig. 11 is a sectional view taken along the line 11—11 in Fig. 10.

The direction indicator is shown in detail in Figs. 9, 10, and 11. The base 171 of the instrument is supported on the instrument panel 172 of the aeroplane by bolts 173. The bearing member 174 which is flanged and bolted to the base is arranged to support the movable member 118 which is journaled on the bearing 174 at 175.

The movable member has attached thereto an arm 176 arranged to be the means for moving the member 118. The arm carries the thumb set screw 177 for manually locking the movable member at a predetermined position. As previously described, this simplified arrangement may be substituted for the radio control unit for remotely controlling the navigation of the plane from a base or ground station, the arrangement being similar to that shown in conjunction with the altimeter in Fig. 1.

The rotary drum member 120 is centered within the member 118 and mounted on the shaft 178 leading from the gyroscopic mechanism in the box 121. The light 119 extends into the drum 120 and is supported by the cross bar 179.

The movable member 118 is provided with an annular recess 181 and the annular lip 182 of the drum member is arranged to rotate in the said recess, thus sealing the two members 118 and 120 from any external light which if permitted to enter would probably cause the photo-electric cells to function improperly.

180 represents a cap fixed to the bar 179 and having an inwardly flanged open end which extends into a recess 183 in the drum member 120, thus preventing the escape of light therebetween.

The face of the direction indicator is calibrated in degrees representing the points of a quadrant of the compass as shown in Fig. 9. A similar calibrator is placed upon the face of the movable member. The center of the calibration has an arrow imprinted thereon which when it is set designates the prescribed course which the plane is to follow.

The arrow on the member 120 is arranged to indicate the number of degrees the plane deviates from its prescribed course.

Fig. 11 shows the member 118 provided with four photo-electric cells each in their respective compartments and arranged to be operated by the light from the lamp 119. It is evident that a greater number of cells could be used, making the instrument more sensitive and causing it to respond to smaller deviations of the plane from the course. The shield 123 is arranged to cover the window 122 in the member 120 when the plane is flying on a straight course, and is sufficiently extended to cover the window until a deviation of about one degree has occurred before the window is exposed. If the plane deviates from its course, a very small amount, the instrument is not intended to function as such small variations are frequent and result in averaging themselves, but if the plane deviates more than one degree the instrument will function and bring it back on its course.

It should be understood that for every additional photo-electric cell placed in the instrument, amplifying equipment and intermediary relays must be added to complete the layout.

The relays 128, 130, 132, 145, 152, 153, 166, and 167, as described in conjunction with the intermediary control circuits of the elevator, aileron and rudder control surfaces of the plane may be of the electro-magnet type. The respective contacts are shown directly below each relay. Relays 166 and 167 are provided with two contacts, one contact which is closed when the relay is energized and the other closed when the relay is deenergized. All of the other relays are provided with only one contact, as shown, which is closed when the relay is energized.

All of these relays are provided with time delay characteristics which prevent them from closing their contacts until the elapse of a short period. The characteristics of such relays are not included within the scope of this application and will therefore not be enlarged upon. The time delay characteristic required by my system is approximately one and one-half seconds. Relays having this time delay before closing their contacts will prevent the completion of the control circuits they govern in case they are momentarily and unintentionally energized by the mercury in the tube switch making contact with one of the contact members due to splashing or some similar cause. The mercury must then continue to be in contact with the contact 14 longer than a period of one and one-half seconds before my system will respond. This feature thus provides a system that is relatively sensitive to the accurate and positive movements of the airplane, yet it will not respond to insignificant or false conditions set up by the movements thereof.

The preferred construction of the mercury tube switches 1 and 38 is shown in Figs. 12 to 17. The cylindrical tube portion 185 is made of some suitable insulating material such as glass or bakelite. The caps 2 which are metallic are secured to the tubular member by a threaded engagement or any other suitable manner that provides a fluid seal.

Figure 12:
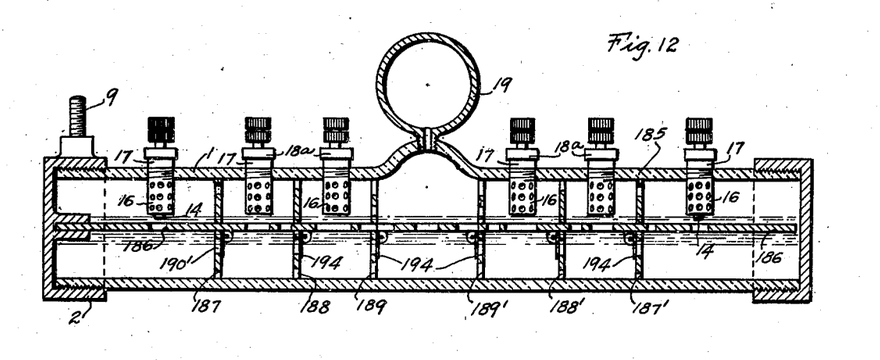
Fig. 12 is an enlarged longitudinal section showing the preferred form of my improved tube switch.

186 represents a horizontally disposed baffle member made of good conductive material and preferably of flat bar shape which extends for substantially the entire distance between the caps 2 and is secured at one end by a good mechanical and electrical connection such as shown at the left in Fig. 12. The bar 186 is of sufficient width to substantially diametrically span the interior of the tube 185.

187, 187', 188, 188', 189, and 189' represent vertically disposed blades having arcuate outer edges which substantially fit the wall of the tube and which act as baffles to the longitudinal travel of the mercury in the interior of the tube. The baffle member 186 and the baffle blades are provided with a plurality of orifices 190 through which the mercury travels in its flow. These orifices are largest towards the center of the tube and are graduated in size towards the ends. Thus the flow of mercury is increasingly retarded towards the ends of the tube but has practically an unrestricted flow in the intermediate portions of the tube, as may be seen in Figs. 13 to 16. This graduated arrangement of the orifices in the baffles prevents any surging or splashing of the mercury in the tube which might result in impairing the function of the mechanism. These metallic baffle members also furnish a low resistance path for the flow of an electric current from the system to the mercury.

If the plane were to go into a sudden dive or roll the mercury would tend to surge towards the lower end of the tube and its inertia would cause it to have a splashing effect. To prevent this I provide each of the depending baffle blades 187 with a centrally disposed port 190' and I also provide each of said ports with a flap valve 194 pivotally mounted on the face of the baffle towards the center of the tube. Thus the flap valve will close to prevent the flow of mercury through its port towards the corresponding end of the tube and will open freely to permit an unrestricted flow of the mercury through its port toward the center of the tube. The flap valves 194 are provided with the small orifices 195 which permit the flow of some of the mercury through the ports 190' of the baffles 187, 188 and 189 as the liquid flows from the center of the tube to either end thereof. This will prevent piling up of the mercury in the lower end of a tube which might result in bringing into electrical contact a larger number of the contact members 14 than may be desired for given amount of tilt of the tube.

It is evident that the provision of baffles and also the parts and flap valves provide a time delay in the operation of my tube switches 1 and 38 and thus small variations of flight will not operate the controls of the plane unnecessarily. This is a valuable feature in this type of control, as excess sensitiveness in the tube switch itself is undesirable.

The expansion chamber 19 positioned above the center of the tube switch is designed to permit the expansion of the fluid or fluids in the liquid or liquids in the tube switch over a temperature range which is generally encountered in airplane practice. This chamber may also be made removable for cleaning and refilling the tube. These tube switches are arranged with the baffle members and the flap valves containing orifices for controlling the flow of the mercury and the non-electrolytic liquid as the tubes are tilted. The mercury being the heavier of the two liquids displaces the lighter liquid as it flows to the lowest end of the tube. This action creates a partial vacuum at the upper end of the tube which tends to retard the flow of the mercury and helps to draw the lighter liquid to the highest end of the tube.

Figure 18:
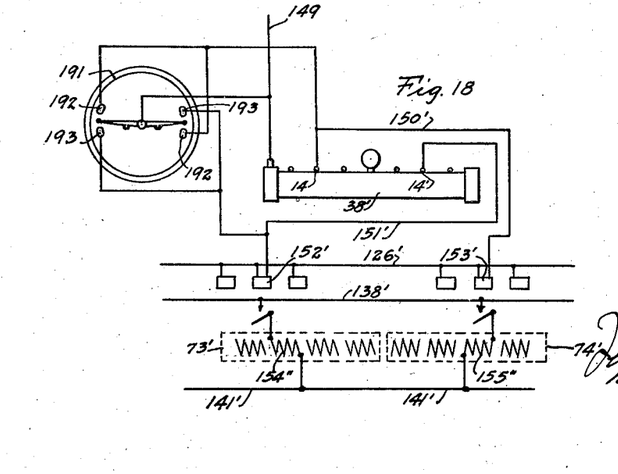
Fig. 18 is a diagrammatic view showing a modification of the aileron control circuit.

Fig. 18 illustrates a modification of a part of my invention. The circuit of the modification is similar to that shown in Fig. 1 involving the tube switch 38 which controls the intermediary circuits of the ailerons. It merely illustrates a means for checking the function of the tube switch and consists of a gyroscopic control instrument 191 which gives a visual indication of horizontal and banking conditions and is provided with multiple contacts 192, 193 which are arranged in multiple with the circuit that is closed when the mercury engages the second contactor 14' from each end of the tube 38.

The theory being that if the plane assumes a perfect bank and the mercury is held in the tube in its normal position by centrifugal force, the gyroscopic control instrument 191 will operate the aileron controls and correct the flight of the plane. It should be kept in mind that a so-called perfect bank seldom occurs as the nose of the craft will assume an angle and the correction of this angle by the control elevator system will permit the aileron control to come into play. However, this modification will provide ample protection in case a so-called perfect bank is encountered.

The words aircraft and airplane are used as synonyms in this specification and are intended to include aircraft of all kinds.

I claim:—

1. In aircraft flight-control, the combination with the elevator control surfaces of an aircraft and an altimeter, of means whereby the altimeter actuates the elevator control surfaces to maintain the aircraft within its predetermined limits of elevation, and means whereby when the aircraft motor stops the altimeter is disconnected from the elevator control surfaces.

2. In aircraft flight-control, the combination with the elevator control surfaces of an aircraft, an altimeter and an air-speed indicator, of operative connection between the altimeter and said surfaces and between the air-speed indicator and said surfaces whereby to maintain the aircraft within its predetermined limits of elevation and at its required flying speed.

3. In aircraft flight-control, the combination with the elevator control surfaces of an aircraft, an altimeter and an air-speed indicator, of operative connections between the altimeter and said surfaces whereby to normally maintain the aircraft within its predetermined limits of altitude, and operative connection between the air-speed indicator and said surfaces arranged to vary altimeter control when the air-speed falls below the required speed of flight of the aircraft.

4. In aircraft control, the combination with the elevator control surfaces of an aircraft, an altimeter and an air-speed indicator, of a fluid switch arranged for tilting, electromechanical means so arranged that when the switch is tilted in one direction said surfaces are actuated positively and when the switch is tilted in the other direction said surfaces are actuated negatively, and operative connection between the altimeter and the switch and between the air-speed indicator and the switch whereby to tilt the switch to maintain the aircraft within its predetermined limits of elevation and at its required flying speed.

5. In aircraft control, the combination with the elevator control surfaces of an aircraft, an altimeter and an air-speed indicator, of a fluid switch arranged for tilting, electro-magnetic means so arranged that when the switch is tilted in one direction said surfaces are actuated positively and when the switch is tilted in the other direction said surfaces are actuated negatively, operative connection between the air-speed indicator and the switch, whereby the aircraft is maintained at its required flying speed, and operative connection between the altimeter and the switch whereby the aircraft while flying at its required speed is maintained within the predetermined limits of elevation.

6. In aircraft flight-control, the combination with the control surfaces of an aircraft of means for operating said control surfaces and means for regulating the intensity of the energy supplied to the control surface operating means in proportion to the power required for their operation, said energy being applied in direct proportion with the air-speed of the craft.

7. In an aircraft flight-control, the combination with an elevator for controlling said craft, of means for operating said elevator, means for controlling said operating means in proportion to the altitude or the air-speed of said craft or a combination of both, the effect of the controlling means upon said operating means being to add or compensate for one another.

8. In aircraft flight-control, the combination with an elevator for controlling an aircraft of means actuated by the altitude of the craft for operating said elevator to maintain a predetermined altitude of said craft, and means actuated by the air-speed of the craft to operate said elevator for maitaining an angle of attack in direct proportion with the air speed of the craft regardless of the operation of said first mentioned means.

9. In a device arranged to operate the control surfaces of an aircraft, the combination of a support arranged to swing on one of the major axes of the aircraft, a control stick pivotally supported on the support and arranged to swing on the other major axis of the aircraft, a pair of oppositely disposed solenoids mounted on the aircraft and operatively connected to the support for swinging it on the first major axis of the aircraft and a second pair of opposed solenoids mounted on the support and arranged to swing the control stick on the other major axis of the aircraft.

10. The combination with a fluid switch arranged for actuation by a plurality of means, of a support hingedly secured at one of its ends to a relatively fixed point, and a second support hingedly secured to the free end thereof, the switch being mounted on said second support and the actuating means being operatively connected to the free end of the first support and to the free end of the second support.

11. The combination with a fluid switch arranged for actuation by a plurality of means, of a support hingedly secured at one of its ends to a relatively fixed point, and a second support overlying the first support and hingedly secured to the free end thereof, the switch being mounted on said second support and the actuating means being operatively connected to the free end of the first support and to the free end of the second support.

12. The combination with a fluid switch, of supporting means therefor arranged to permit the tilting of the switch in either direction, and actuating means attached at either end of said switch for independently tilting the latter.

13. In aircraft flight-control, the combination of a servo-motor for operating the elevator control surfaces of the aircraft, a circuit controller arranged to energize the servo-motor, an altimeter device for operating the circuit controller to maintain the aircraft within predetermined limits of altitude, and an air-speed indicator for rating the circuit controller jointly with and in response to the air-speed to maintain the aircraft at its required flying speed.

14. In an aircraft, the combination of a speed responsive means, an altimeter, a fluid switch, means for mounting the fluid switch to permit tilting longitudinally in either direction, connections between the speed responsive means and the fluid switch for moving one end of the switch, and connections between the altimeter and the other end of the switch whereby to maintain the aircraft at its required flying speed and within predetermined limits of elevation.

JAMES M. HENDRICKSON.